April 7, 1925.
M. BOUFFART
PRESSURE INDICATING APPARATUS
Filed March 6, 1922
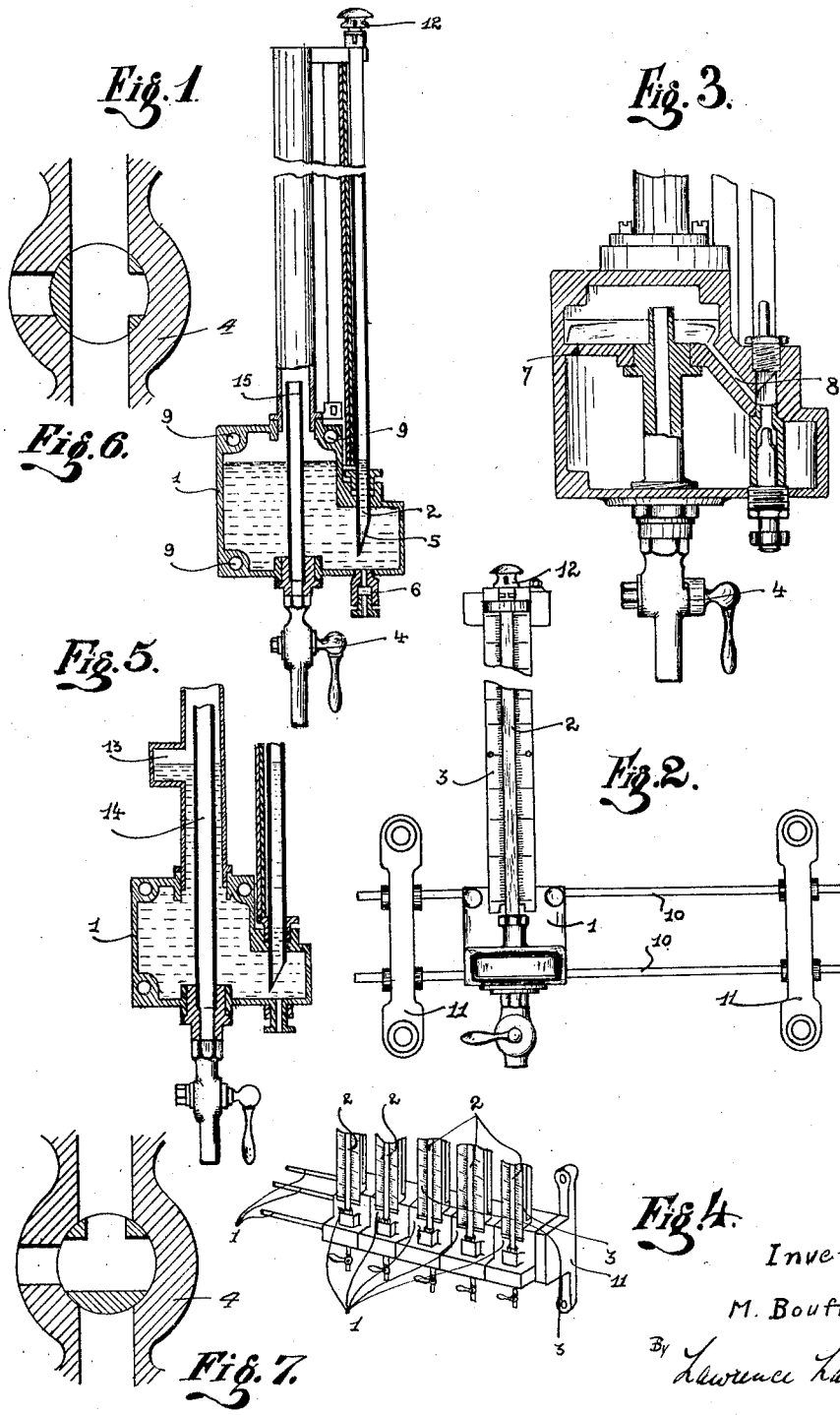
Inventor:
M. Bouffart
By Lawrence Langner
Attorney Patented Apr. 7, 1925.

1,532,170

UNITED STATES PATENT OFFICE.

MAURICE BOUFFART, OF HERSTAL, BELGIUM.

PRESSURE-INDICATING APPARATUS.

Application filed March 6, 1922. Serial No. 541,614.

*To all whom it may concern:*

Be it known that I, MAURICE BOUFFART, a subject of the King of Belgium, and resident of Herstal, in the Kingdom of Belgium, have invented certain new and useful Improvements in a Pressure-Indicating Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a pressure indicating apparatus comprising two communicating tubes containing liquid, the pressure to be measured acting upon the surface of the liquid in one of the tubes and the reading being effected through the other tube.

In known apparatus of this kind, use is made of a U-shaped tube the branches of which have approximately equal sections.

The pressure to be measured causes the level of the liquid to fall in one of the branches and to rise in the other branch. It is therefore necessary to graduate the tubes in half size thus producing a cause of confusion for the workmen, which may become a cause of serious mistakes.

On the other hand, in this apparatus the branch which receives the pressure of the gas becomes soon dirty, the deposits left by the gas make the liquids dirty, and owing to the small quantity of liquid and to the alternating movement of the latter, the second branch too is tarnished.

After a few months of working the readings become difficult and the errors are frequent.

With a view to doing away with the above drawbacks the present invention provides an arrangement which almost annuls the movement of the surface of the liquid which is in contact with the gas.

To this end, an almost unvariable level is ensured for the liquid contained in the tube in which exists the pressure to be measured, and this whatever may be the pressure variations to which the surface of the liquid is subjected.

This result is obtained by giving to the section of the tube which is in contact with the gas an appreciably larger section than that of the tube in which is effected the reading of the pressure.

To this end, according to the present invention use is made of a tank of a relatively large volume filled with liquid in which is immersed a tube of small section.

Under the effect of a pressure or depression the level rises or falls in the tube, whilst it remains practically constant in the tank.

This arrangement has the considerable advantage that it permits a direct reading, in full size, by observation of one level only.

On the other side owing to the large quantity of liquid in the tank, and which is there almost without any motion, the impurities of the gas may be deposited without ever reaching the tube on which the readings are made, the said tube being never tarnished.

The above said widened part is always at the level of the zero of the apparatus: in the case of the measurement of a pressure the said widened part is at the base of the apparatus; for measuring a depression it is at the upper part, and when either a pressure or depression is to be measured, it is at the middle part.

In the accompanying drawings:—

Fig. 1 is a section of a pressure measuring apparatus.

Figs. 2 and 4 show the fixation of the apparatus in the case when several instruments are connected in one central board, Fig. 3 is a view of an apparatus for measuring high pressures, Fig. 5 is a section of an apparatus, which may serve for measuring either a pressure or a depression.

Figures 6 and 7 are sectional views of a valve used in the device.

The apparatus illustrated in the drawings comprises a metallic tank 1, of a relatively large volume containing liquid in which a glass tube 2 is immersed.

The pressure (or depression) to be measured brought in by the tube 14 acts always in the tank in such a manner as to cause the rising (or lowering) of the liquid in the above said glass tube 2.

The said glass tube is provided with a metallic scale which is enamelled or cast with relief numerals 3 and is graduated in full size.

The pressure or depression to be measured is always brought from below.

This arrangement has the advantage of preventing tars or other impurities from coming along the gas tube up to the apparatus, and moreover it facilitates the assemblage of apparatus into groups, because it allows of giving to all these apparatus the maximum of similarity in the outside shape and make them interchangeable.

With a view to permitting an easy checking of the zero of the apparatus, the apparatus is provided with a three-way cock 4 permitting the communication of the tank, either with the pressure or depression to be measured, or with the atmosphere as shown in Figures 6 and 7, respectively.

In order to render the zero of the apparatus visible, the invention provides a widening 5 of the lower part of the tank on the side on which the tube is placed, and of such a height that the zero will be outside the metal.

In order to permit the withdrawal of the liquid and therefore to adjust exactly the zero of the apparatus, or to empty the latter completely, the apparatus is provided with a valved tube 6.

In order to be able to clean the glass tube without dismounting it, the said tube is arranged exactly under the glass tube.

When the apparatus serves to measure a pressure and a depression, it is provided with a tank 13 (Fig. 5) arranged towards the middle of the tube. A tube 14 brings the pressure or depression to the level of the tank. The zero of the apparatus is approximately at the same level as the tank. The lower tank is however maintained in order to maintain a uniformity of appearance of the apparatuses, and to facilitate their assemblage on central boards as will be explained hereinafter.

In the case when the apparatus is applied for measuring high pressures or depressions, when use is made of mercury, the present invention provides a construction which requires a very small volume of liquid only.

To this end, the apparatus is provided with a false bottom 7 as shown in Fig. 3. The mercury communicates with the glass tube by means of a channel 8.

With a view to effecting the assemblage of a certain number of apparatus on to a central board, the tanks of the apparatus carry holes 9 through which pass rods 10.

The rods are fixed by means of members such as 11. Owing to this arrangement it is possible easily to increase the number of apparatus without the necessity of sending the boards away to the constructors.

The upper end of the glass tube 2 is protected against dust by means of a cap 12 provided with openings, the latter being directed downwards.

According to the invention, all the apparatus are interchangeable since they have the same shape and size.

By replacing the glass tube by a larger one which can be done easily, it is possible to convert an apparatus which has been supplied for a certain pressure into an apparatus to be used for any other pressure.

What I claim is:

1. A liquid pressure indicating apparatus, comprising, a reservoir for containing liquid, an indicator tube, open to atmospheric pressure, and having a graduated scale with its zero between the middle and the upper end of the scale, a pressure tube having an enlarged portion on which acts the pressure to be measured, both said tubes being entered into said reservoir, a conduit for conducting the pressure to be measured, said conduit entering the said pressure tube at its base, said enlarged portion being positioned at a level between the middle and the upper part of the apparatus, to coincide with the level of the zero of the graduation of the indicating tube.

2. A liquid pressure indicating apparatus, comprising, a reservoir for containing liquid, an indicator tube open to atmospheric pressure, and having a graduated scale with its zero between the middle and the upper end of the scale, a pressure tube having an enlarged portion on which the pressure to be measured acts, both said tubes being entered into said reservoir, a conduit for conducting the pressure to be measured, said conduit entering the said pressure tube at its base, and a three way cock positioned in the conduit, said cock permitting communication of said pressure tube in one position with the pressure to be measured and in the other position with atmospheric pressure for putting the apparatus at normal pressure.

In testimony whereof I affix my signature in presence of two witnesses.

MAURICE BOUFFART.

Witnesses:
CH. MEREHIE,
G. RIGA.